United States Patent
Yu et al.

(10) Patent No.: US 11,683,780 B2
(45) Date of Patent: Jun. 20, 2023

(54) DEFINING RSTD REPORT RESOLUTION AND ACCURACY FOR RSTD-BASED 5G NR POSITIONING

(71) Applicant: Intel Corporation, Santa Clara, CA (US)

(72) Inventors: Zhibin Yu, Unterhaching (DE); Rui Huang, Beijing (CN); Andrey Chervyakov, Nizhny Novgorod (RU); Alexey Khoryaev, Nizhny Novgorod (RU); Qiming Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 17/061,032

(22) Filed: Oct. 1, 2020

(65) Prior Publication Data

US 2021/0022105 A1  Jan. 21, 2021

Related U.S. Application Data

(60) Provisional application No. 62/910,957, filed on Oct. 4, 2019.

(51) Int. Cl.
*H04W 64/00* (2009.01)
*G01S 1/20* (2006.01)
*G01S 5/10* (2006.01)

(52) U.S. Cl.
CPC .............. *H04W 64/003* (2013.01); *G01S 1/20* (2013.01); *G01S 5/10* (2013.01)

(58) Field of Classification Search
CPC ....... H04W 64/003; H04W 64/00; G01S 1/20; G01S 5/10; G01S 5/0036
USPC ................................................ 455/456.1–457
See application file for complete search history.

(56) References Cited

U.S. PATENT DOCUMENTS

| 2013/0260793 | A1* | 10/2013 | Lim | H04W 4/02 455/456.1 |
| 2017/0171857 | A1* | 6/2017 | Lee | H04W 24/10 |
| 2018/0302873 | A1* | 10/2018 | Kazmi | H04W 24/10 |

* cited by examiner

*Primary Examiner* — Michael Y Mapa
(74) *Attorney, Agent, or Firm* — Schwegman Lundberg & Woessner, P.A.

(57) ABSTRACT

An apparatus for use in a UE includes processing circuitry coupled to a memory. To configure the UE for Reference Signal Time Difference (RSTD)-based 5G-NR positioning. The processing circuitry is to determine a first PRS BW associated with a first PRS received from a first gNB associated with a first cell. A second PRS BW is determined, which is associated with a second PRS received from a second gNB of a second cell. An RSTD report resolution is determined based on the first PRS BW and the second PRS BW. A receive (Rx) timing difference between the first cell and the second cell is measured based on reception times of the first PRS and the second PRS. The measured Rx timing difference is mapped into an RSTD report for transmission to the first gNB, based on the RSTD report resolution.

18 Claims, 5 Drawing Sheets

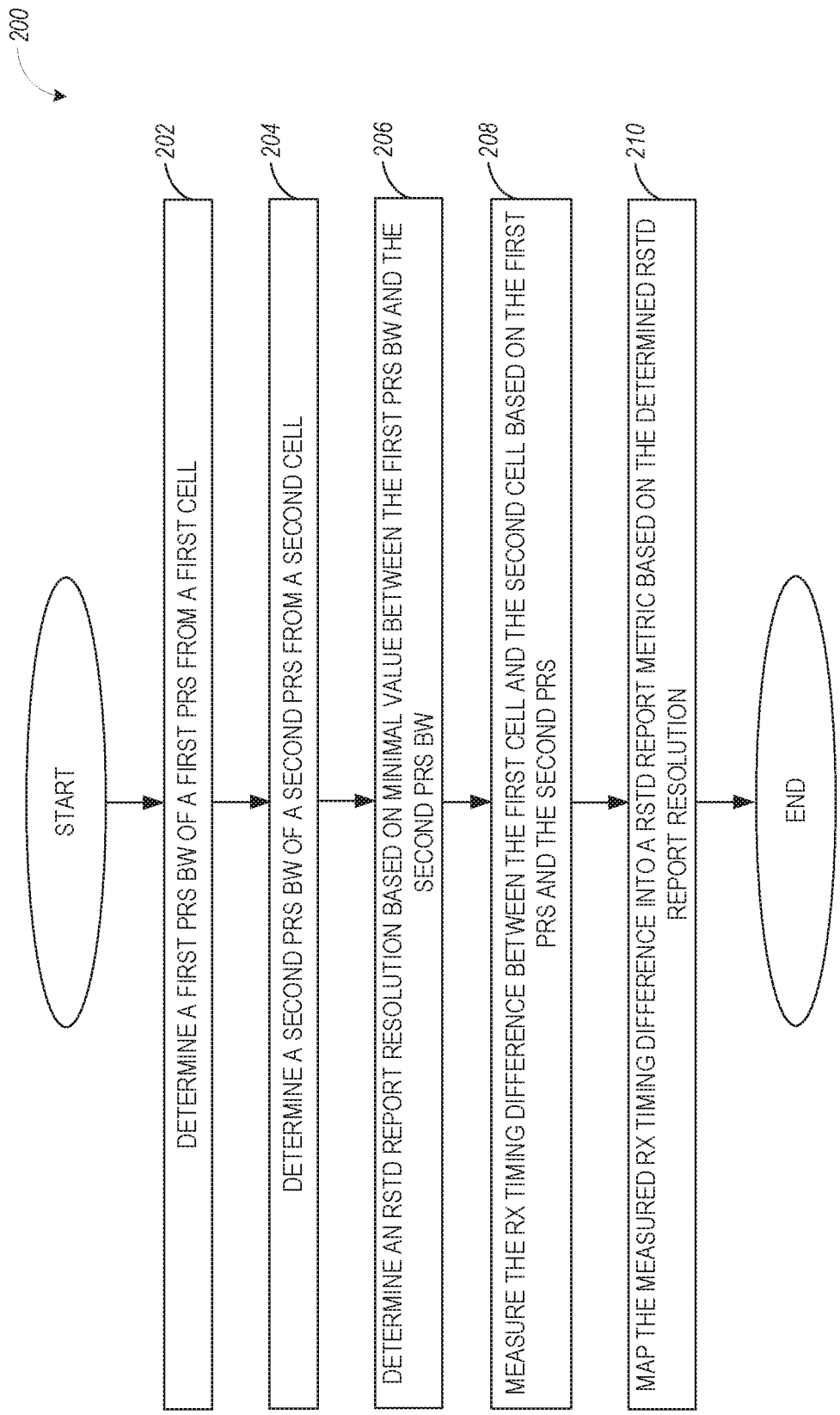

DEFINING RSTD REPORT RESOLUTION AND ACCURACY FOR RSTD-BASED 5G NR POSITIONING

PRIORITY CLAIM

This application claims the benefit of priority to U.S. Provisional Patent Application Ser. No. 62/910,957, filed Oct. 4, 2019, and entitled "METHODS OF DEFINING RSTD REPORT RESOLUTION AND ACCURACY REQUIREMENT FOR RSTD BASED 5G NR POSITIONING." This provisional patent application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks such as 5G NR unlicensed spectrum (NR-U) networks. Other aspects are directed to systems and methods for defining reference signal time difference (RSTD) report resolution and accuracy for RSTD-based 5G-NR device positioning.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed to spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques for defining RSTD report resolution and accuracy for RSTD-based 5G-NR device positioning.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

FIG. 2 illustrates a flow diagram of a method for RSTD report resolution selection and mapping of RSTD into an RSTD report metric based on the RSTD report resolution, in accordance with some embodiments.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
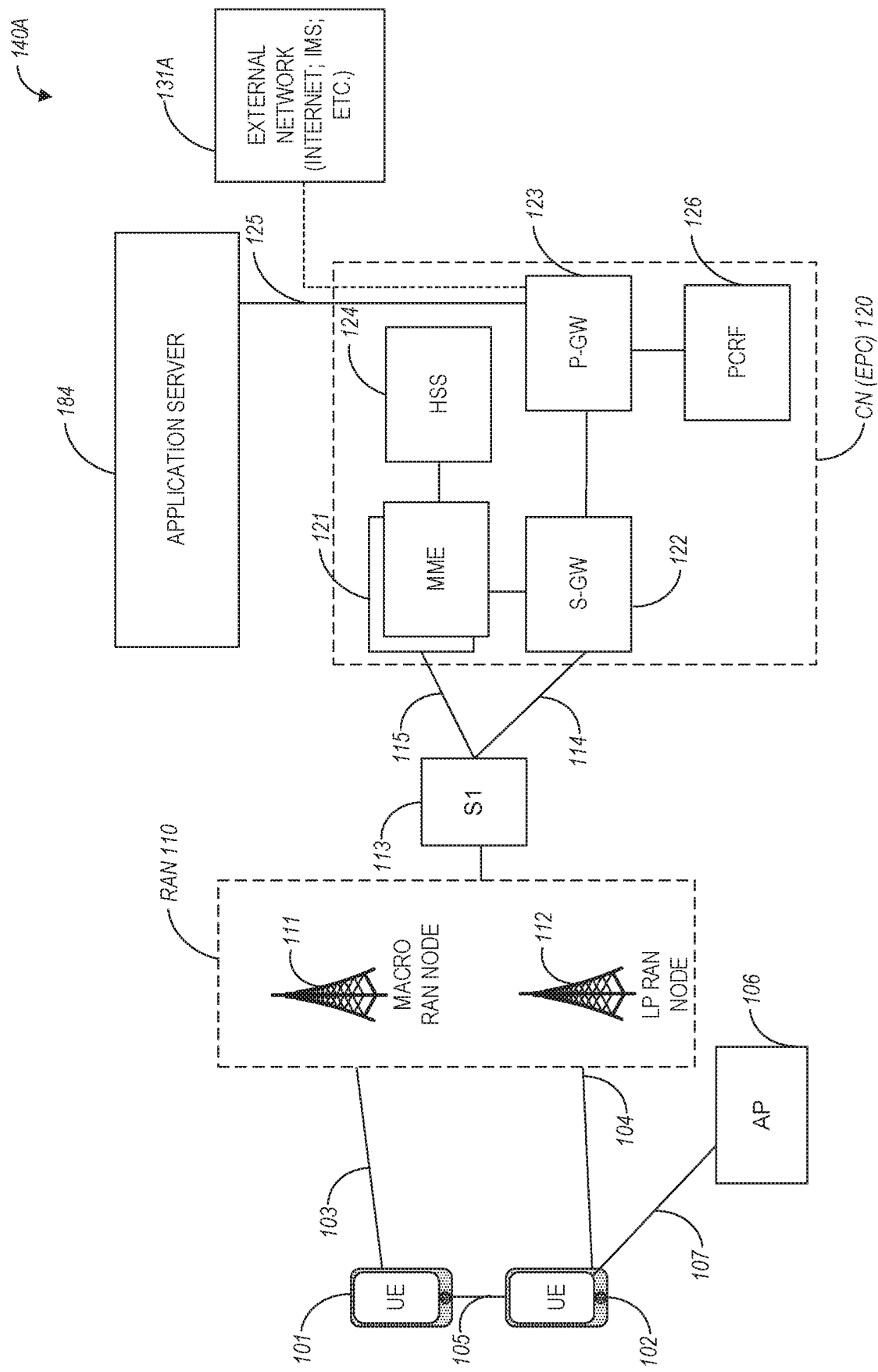
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Tings (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-1). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
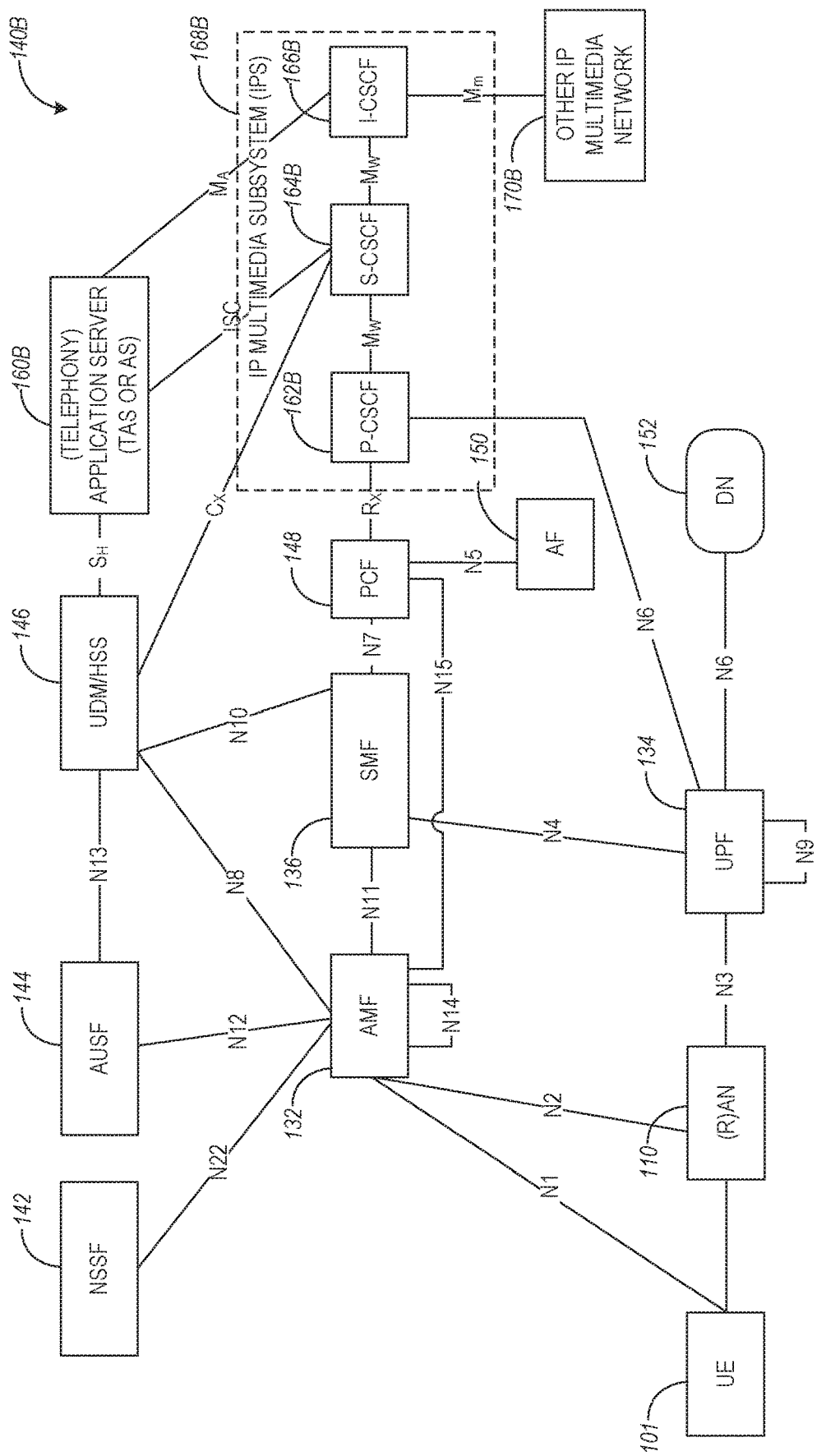
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132). N3 (between the RAN 110 and the UPF 134), N4 (between the SMF 136 and the UPF 134), N5 (between the PCF 148 and the AF 150, not shown), N6 (between the UPF 134 and the DN 152). N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
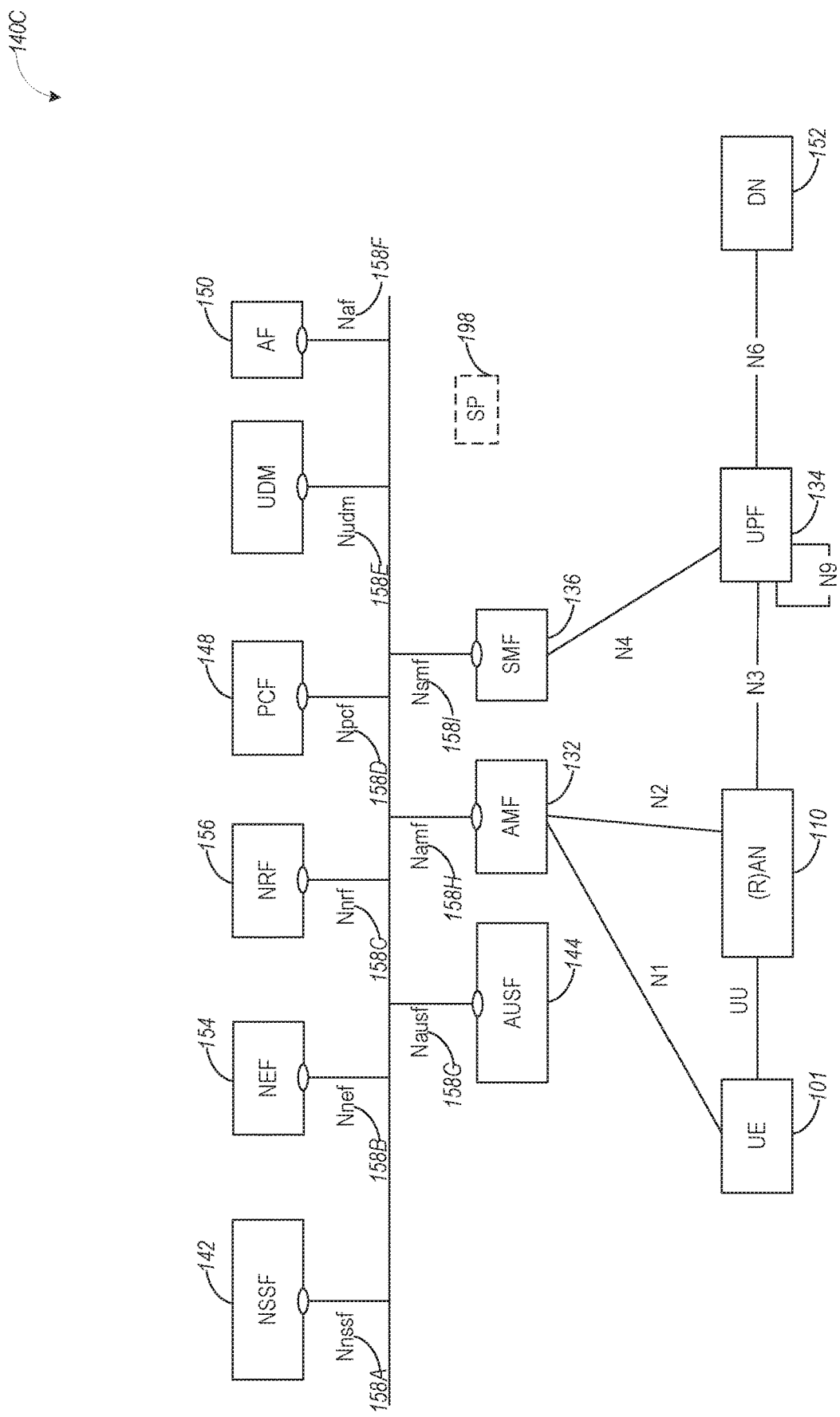

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In example embodiments, any of the UEs or base stations discussed in connection with FIG. 1A-FIG. 1C can be configured to operate using the techniques discussed in connection with FIG. 2 and FIG. 3.

Cellular technology-based UE positioning may be based on multi-lateration techniques where the serving base station estimates the UE location, based on UE-reported measurements on the downlink reference signal (DL RS) (e.g., timing, angle, cell ID, etc.), and/or based on direct measurement of UE transmitted uplink reference signals (UL RS), which are received by the base stations. For 3GPP design, 4G LTE based positioning technology has been developed since Release 9, while 5G NR based positioning technology is currently under development for Release 16. For downlink (DL) based positioning methods, one key method which may be used is Observed Time Difference of Arrival (OT-DOA), which is further based on Reference Signal Time Difference (RSTD) measurements reported from the UE side. For RSTD measurements, the UE may estimate the received timing differences of different base stations, based on the received downlink positioning reference signals (DL PRSs) from different base stations, and then report the RSTD results to the serving base station.

Currently, the RSTD accuracy requirements and RSTD report resolution for 5G NR are to be defined by RAN4 for Release 16. Techniques discussed herein may be used to optimize the definition of RSTD measurement accuracy requirements as well as the RSTD report resolution, to optimize the trade-off between UE complexity and NR positioning performance.

In some NR-related aspects, the RSTD measurement is based on NR PRS. For LTE PRS, the PRS bandwidth is the same as the system bandwidth of an LTE cell, with fixed sub-carrier-spacing (SCS) and fixed reference resource element (RE) number. For NR PRS, however, the SCS, the reference RE number, as well as the PRS BW for NR PRS can be flexibly configured. To optimize the trade-off between UE complexity and NR positioning performance, the disclosed techniques can be used to adapt the RSTD report resolution as well as accuracy measurement requirements based on the flexible PRS configurations.

In some embodiments, the disclosed techniques include adapting the RSTD report resolution based on the allocation bandwidth of the PRSs, which are used for RSTD measurement. As for one example, the RSTD report resolution could be directly selected between a reference timing unit Ts and a minimal timing unit Tc, in the following form:

$$\text{RSTD report resolution} = \begin{cases} Ts, \text{ if } PRS_{BW} \leq Th \\ k*Tc, \text{ if } PRS_{BW} > Th \end{cases} \quad (1)$$

In the above formula (1), Th is a predefined threshold and an example value could be 20 MHz. In some embodiments, separate thresholds may be used for Ts and Tc. In some embodiments, the RSTD report resolution may be determined by the base station and communicated to the UE via configuration signaling.

In the above formula (1), Ts is the legacy LTE RSTD resolution, which is also the reference time unit for the reference numerology. In some embodiments, Ts can be computed in the following form:

$$T_s = 1/(\Delta f_{ref} \cdot N_{f,ref}) = 32.5 \text{ ns, wherein } \Delta f_{ref} = 15 \cdot 10^3 \text{ Hz}, N_{f,ref} = 2048. \quad (2)$$

In the above formula (1), Tc is the finest timing resolution that can be achieved by NR. In some embodiments, Tc can be computed in the following form:

$$T_c = 1/(\Delta f_{max} \cdot N_f) = 0.5 \text{ ns, wherein } \Delta f \max = 480 \cdot 10^3 \text{ Hz}, N_f = 4096, \text{ and } k \text{ is an integer greater than } 1. \quad (3)$$

In some embodiments, when an RSTD value is determined based on two PRSs from different cells with different PRS BW, the smaller PRS BW may be selected to further determine the RSTD report resolution. FIG. 2 illustrates a flow diagram of a method 200 for RSTD report resolution selection and mapping of RSTD into an RSTD report metric based on the RSTD report resolution, in accordance with some embodiments. Referring to FIG. 2, at operation 202, a first positioning reference signal (PRS) bandwidth (BW) associated with the first PRS received from the first Next Generation Node-B (gNB) is determined. The first gNB is associated with a first cell. At operation 204, a second PRS BW associated with a second PRS received from a second gNB is determined. The second gNB is associated with a second cell. At operation 206, an RSTD report resolution is determined based on the first PRS BW and the second PRS BW. For example, the smaller of the first and second PRS BW may be selected as a minimal PRS BW. For example, the RSTD report resolution is selected based on the formula (1) above. In some embodiments, the RSTD report resolution is determined by the gNB and is communicated to the UE via configuration signaling. At operation 208, a receive (Rx) timing difference between the first cell and the second cell is measured based on reception times of the first PRS and the second PRS. At operation 210, the measured Rx timing difference is mapped into an RSTD report for transmission to the first gNB, based on the RSTD report resolution.

In some embodiments, the disclosed techniques may include adapting the maximal allowed RSTD errors based on the PRS BW, such that a higher RSTD error margin could be defined for PRS with smaller BW while lower RSTD error margin could be defined for PRS with higher BW.

In some embodiments, the disclosed techniques may include adapting the signal-to-noise ratio (SNR) side condition for RSTD accuracy requirement based on the total number of reference REs within a PRS symbol, such that the SNR side condition is tightened for PRS with a higher number of ref. REs, while the SNR side condition is relaxed for PRS with a lower number of ref. REs.

In some embodiments, the disclosed techniques may include performing an exact calculation to determine the RSTD report resolution. In some aspects, for a given PRS bandwidth, the corresponding RSTD resolution could be linearly scaled from the highest possible resolution (e.g., with regard to the highest PRS BW) by the actual PRS bandwidth. That is because the DL PRS bandwidth is expected to be configurable up to max channel bandwidth. Therefore, the minimum reporting granularity may be a fraction of $T_c/2$ and it may be scaled inversely proportionally to the DL PRS bandwidth used by UE for DL PRS processing. In some aspects, the following expression may be used to determine the granularity of RSTD reporting:

$$RSTD \text{ report resolution} = \left(\frac{400 \text{ MHz}}{BW_{PRS}}\right) \cdot \frac{T_c}{2}, \quad (4)$$

where $Tc = 0.5$ ns.

In some embodiments, the scaling factor of ½ could be skipped, such that the following expression can also be used to determine the granularity of RSTD reporting:

$$RSTD \text{ report resolution} = \left(\frac{400 \text{ MHz}}{BW_{PRS}}\right) \cdot T_c, \quad (5)$$

where $Tc = 0.5$ ns.

In some embodiments, in both formula (4) and formula (5), Tc=0.5 ns and $BW_{PRS}$ is the channel BW in MHz selected from the set [5, 10, 20, 25, 40, 50, 80, 100, 200, 400] MHz and closest to the bandwidth of DL PRS receive processing.

In some embodiments, a method is disclosed that user equipment (UE) receives at least two positioning reference signals, from two different base stations, and reports a reference signal reference received timing difference (RSTD) between the two base stations, based on the received PRSs. The resolution of the reported RSTD is determined by the actual bandwidths of the PRSs. In some embodiments, the RSTD report resolution is set to be a reference timing unit, Ts, if the PRS BW is below a pre-defined threshold. In some embodiments, the RSTD report resolution is set to be minimal timing unit, Tc, if the PRS BW is higher than a pre-defined threshold. In some embodiments, the PRS BW, which is used for RSTD report resolution selection, is the minimal BW of the BWs of the measured PRS signals. In some embodiments, the measurement accuracy requirements of the reported RSTD are determined based on the bandwidths of the PRS, which are used for RSTD measurement. In some embodiments, the SNR side conditions for RSTD measurement accuracy requirements are determined based on the total number of reference resource elements (ref. REs) of the PRS, which is used for RSTD measurement.

Figure 3:
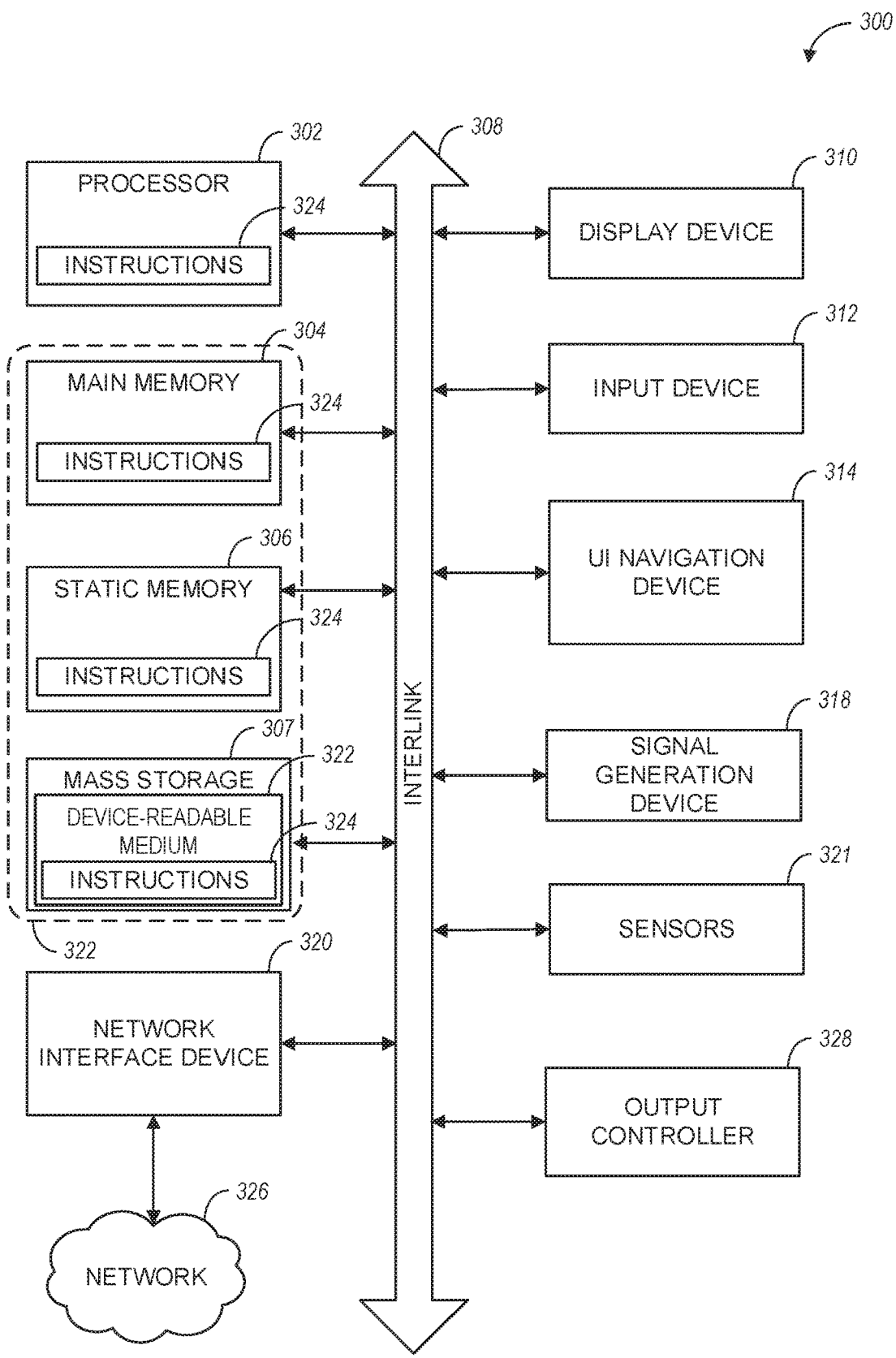
FIG. 3 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 3 illustrates a block diagram of a communication device such as an evolved Node-B (eNB), a next generation Node-B (gNB), an access point (AP), a wireless station (STA), a mobile station (MS), or user equipment (UE), in accordance with some aspects and to perform one or more of the techniques disclosed herein. In alternative aspects, the communication device 300 may operate as a standalone device or may be connected (e.g., networked) to other communication devices.

Circuitry (e.g., processing circuitry) is a collection of circuits implemented in tangible entities of the device 300 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 300 follow.

In some aspects, the device 300 may operate as a standalone device or may be connected (e.g., networked) to other devices. In a networked deployment, the communication device 300 may operate in the capacity of a server communication device, a client communication device, or both in server-client network environments. In an example, the communication device 300 may act as a peer communication device in a peer-to-peer (P2P) (or other distributed) network environment. The communication device 300 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 300 may include a hardware processor 302 (e.g., a central processing unit (CPU), a graphics processing unit (GPU), a hardware processor core, or any combination thereof), a main memory 304, a static memory 306, and mass storage 307 (e.g., hard drive, tape drive, flash storage, or other block or storage devices), some or all of which may communicate with each other via an interlink (e.g., bus) 308.

The communication device 300 may further include a display device 310, an alphanumeric input device 312 (e.g., a keyboard), and a user interface (UI) navigation device 314 (e.g., a mouse). In an example, the display device 310, input device 312, and UI navigation device 314 may be a touchscreen display. The communication device 300 may additionally include a signal generation device 318 (e.g., a speaker), a network interface device 320, and one or more sensors 321, such as a global positioning system (GPS) sensor, compass, accelerometer, or another sensor. The communication device 300 may include an output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 307 may include a communication device-readable medium 322, on which is stored one or more sets of data structures or instructions 324 (e.g., software) embodying or utilized by any one or more of the techniques or functions described herein. In some aspects, registers of the processor 302, the main memory 304, the static memory 306, and/or the mass storage 307 may be, or include (completely or at least partially), the device-readable medium 322, on which is stored the one or more sets of data structures or instructions 324, embodying or utilized by any one or more of the techniques or functions described herein. In an example, one or any combination of the hardware processor 302, the main memory 304, the static memory 306, or the mass storage 316 may constitute the device-readable medium 322.

As used herein, the term "device-readable medium" is interchangeable with "computer-readable medium" or "machine-readable medium". While the communication device-readable medium 322 is illustrated as a single medium, the term "communication device-readable medium" may include a single medium or multiple media (e.g., a centralized or distributed database, and/or associated caches and servers) configured to store the one or more instructions 324. The term "communication device-readable medium" is inclusive of the terms "machine-readable medium" or "computer-readable medium", and may include any medium that is capable of storing, encoding, or carrying instructions (e.g., instructions 324) for execution by the communication device 300 and that cause the communication device 300 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 324 may further be transmitted or received over a communications network 326 using a transmission medium via the network interface device 320 utilizing any one of a number of transfer protocols. In an example, the network interface device 320 may include one or more physical jacks (e.g., Ethernet, coaxial, or phone jacks) or one or more antennas to connect to the communications network 326. In an example, the network interface device 320 may include a plurality of antennas to wirelessly communicate using at least one of single-input-multiple-output (SIMO), MIMO, or multiple-input-single-output (MISO) techniques. In some examples, the network interface device 320 may wirelessly communicate using Multiple User MIMO techniques.

The term "transmission medium" shall be taken to include any intangible medium that is capable of storing, encoding, or carrying instructions for execution by the communication device 300, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus to be used in a user equipment (UE), the apparatus comprising:
  processing circuitry, wherein to configure the UE for reporting on Reference Signal Time Difference (RSTD)-based 5G-New Radio (NR) positioning, the processing circuitry is to:
  determine a first positioning reference signal (PRS) bandwidth (BW) associated with a first PRS received from a first Next Generation Node-B (gNB), the first gNB associated with a first cell;
  determine a second PRS BW associated with a second PRS received from a second gNB, the second gNB associated with a second cell;
  determine an RSTD report resolution based on the first PRS BW and the second PRS BW;

measure a receive (Rx) timing difference between the first cell and the second cell based on reception times of the first PRS and the second PRS; and map the measured Rx timing difference into an RSTD report for transmission to the first gNB, based on the RSTD report resolution; and a memory coupled to the processing circuitry and configured to store the first PRS BW and the second PRS BW.

2. The apparatus of claim 1, wherein the processing circuitry is to:

determine the RSTD report resolution based on a minimal PRS BW selected from the first PRS BW and the second PRS BW.

3. The apparatus of claim 2, wherein the processing circuitry is to:

determine the RSTD report resolution to be one of a reference timing unit (Ts) or a multiple of a minimal timing unit (Tc) based on a comparison of the minimal PRS BW with a pre-configured threshold value.

4. The apparatus of claim 3, wherein $T_s=1/(\Delta f_{ref} \cdot N_{f,ref})$ =32.5 ns, and wherein $\Delta f_{ref}=15 \cdot 10^3$ Hz and $N_{f,ref}=2048$.

5. The apparatus of claim 3, wherein $T_c=1/(\Delta f_{max} \cdot N_f)=0.5$ ns, and wherein $\Delta f_{max}=480 \cdot 10^3$ Hz and $N_f=4096$.

6. The apparatus of claim 2, wherein the processing circuitry is to:

determine the RSTD report resolution as $$\left(\frac{400 \text{ MHz}}{BW_{PRS}}\right) \cdot \frac{T_c}{2},$$

wherein $T_c=0.5$ ns, and wherein $BW_{PRS}$ is selected based on the minimal PRS BW.

7. The apparatus of claim 6, wherein the $BW_{PRS}$ is a bandwidth selected from a set of [5, 10, 20, 25, 40, 50, 80, 100, 200, 400] MHz and is closest to the minimal PRS BW.

8. The apparatus of claim 2, wherein the processing circuitry is to:

determine the RSTD report resolution as $$\left(\frac{400 \text{ MHz}}{BW_{PRS}}\right) \cdot T_c,$$

wherein $T_c=0.5$ ns and $BW_{PRS}$ is selected based on the minimal PRS BW.

9. The apparatus of claim 8, wherein the $BW_{PRS}$ is a bandwidth selected from a set of [5, 10, 20, 25, 40, 50, 80, 100, 200, 400] MHz and is closest to the minimal PRS BW.

10. The apparatus of claim 1, further comprising transceiver circuitry coupled to the processing circuitry; and, one or more antennas coupled to the transceiver circuitry.

11. A non-transitory computer-readable storage medium that stores instructions for execution by one or more processors of a user equipment (UE), the instructions to configure the UE for Reference Signal Time Difference (RSTD)-based 5G-New Radio (NR) positioning, and to cause the UE to:

determine a first positioning reference signal (PRS) bandwidth (BW) associated with a first PRS received from a first Next Generation Node-B (gNB), the first gNB associated with a first cell;

determine a second PRS BW associated with a second PRS received from a second gNB, the second gNB associated with a second cell;

determine an RSTD report resolution based on the first PRS BW and the second PRS BW;

measure a receive (Rx) timing difference between the first cell and the second cell based on reception times of the first PRS and the second PRS; and map the measured Rx timing difference into an RSTD report for transmission to the first gNB, based on the RSTD report resolution.

12. The computer-readable storage medium of claim 11, wherein executing the instructions further configures the UE to:

determine the RSTD report resolution based on a minimal PRS BW selected from the first PRS BW and the second PRS BW.

13. The computer-readable storage medium of claim 12, wherein executing the instructions further configures the UE to:

determine the RSTD report resolution to be one of a reference timing unit (Ts) or a multiple of a minimal timing unit (Tc) based on a comparison of the minimal PRS BW with a pre-configured threshold value.

14. The computer-readable storage medium of claim 13, wherein $T_s=1/(\Delta f_{ref} \cdot N_{f,ref})=32.5$ ns, and wherein $\Delta f_{ref}=15 \cdot 10^3$ Hz and $N_{f,ref}=2048$.

15. The computer-readable storage medium of claim 13, wherein $T_c=1/(\Delta f_{max} \cdot N_f)=0.5$ ns, and wherein $\Delta f_{max}=480 \cdot 10^3$ Hz and $N_f=4096$.

16. The computer-readable storage medium of claim 12, wherein executing the instructions further configures the UE to:

determine the RSTD report resolution as $$\left(\frac{400 \text{ MHz}}{BW_{PRS}}\right) \cdot \frac{T_c}{2},$$

wherein $T_c=0.5$ ns, and wherein $BW_{PRS}$ is selected based on the minimal PRS BW.

17. The computer-readable storage medium of claim 16, wherein the $BW_{PRS}$ is a bandwidth selected from a set of [5, 10, 20, 25, 40, 50, 80, 100, 200, 400] MHz and is closest to the minimal PRS BW.

18. The computer-readable storage medium of claim 12, wherein executing the instructions further configures the UE to:

determine the RSTD report resolution as $$\left(\frac{400 \text{ MHz}}{BW_{PRS}}\right) \cdot T_c,$$

wherein $T_c=0.5$ ns and $BW_{PRS}$ is the selected based on the minimal PRS BW, wherein the $BW_{PRS}$ is a bandwidth selected from a set of [5, 10, 20, 25, 40, 50, 80, 100, 200, 400] MHz and is closest to the minimal PRS BW.

* * * * *

UNITED STATES PATENT AND TRADEMARK OFFICE
CERTIFICATE OF CORRECTION

| | |
|---|---|
| PATENT NO. | : 11,683,780 B2 |
| APPLICATION NO. | : 17/061032 |
| DATED | : June 20, 2023 |
| INVENTOR(S) | : Yu et al. |

It is certified that error appears in the above-identified patent and that said Letters Patent is hereby corrected as shown below:

In the Claims

In Column 13, Line 53, in Claim 10, delete "circuitry; and," and insert --circuitry and-- therefor Signed and Sealed this
Fifth Day of November, 2024

Katherine Kelly Vidal
*Director of the United States Patent and Trademark Office*